Nov. 10, 1964  D. S. GELLETICH  3,156,786
SUSPENSION SYSTEM FOR ELECTROMAGNETIC TRANSDUCERS
Filed Sept. 22, 1961  2 Sheets-Sheet 1
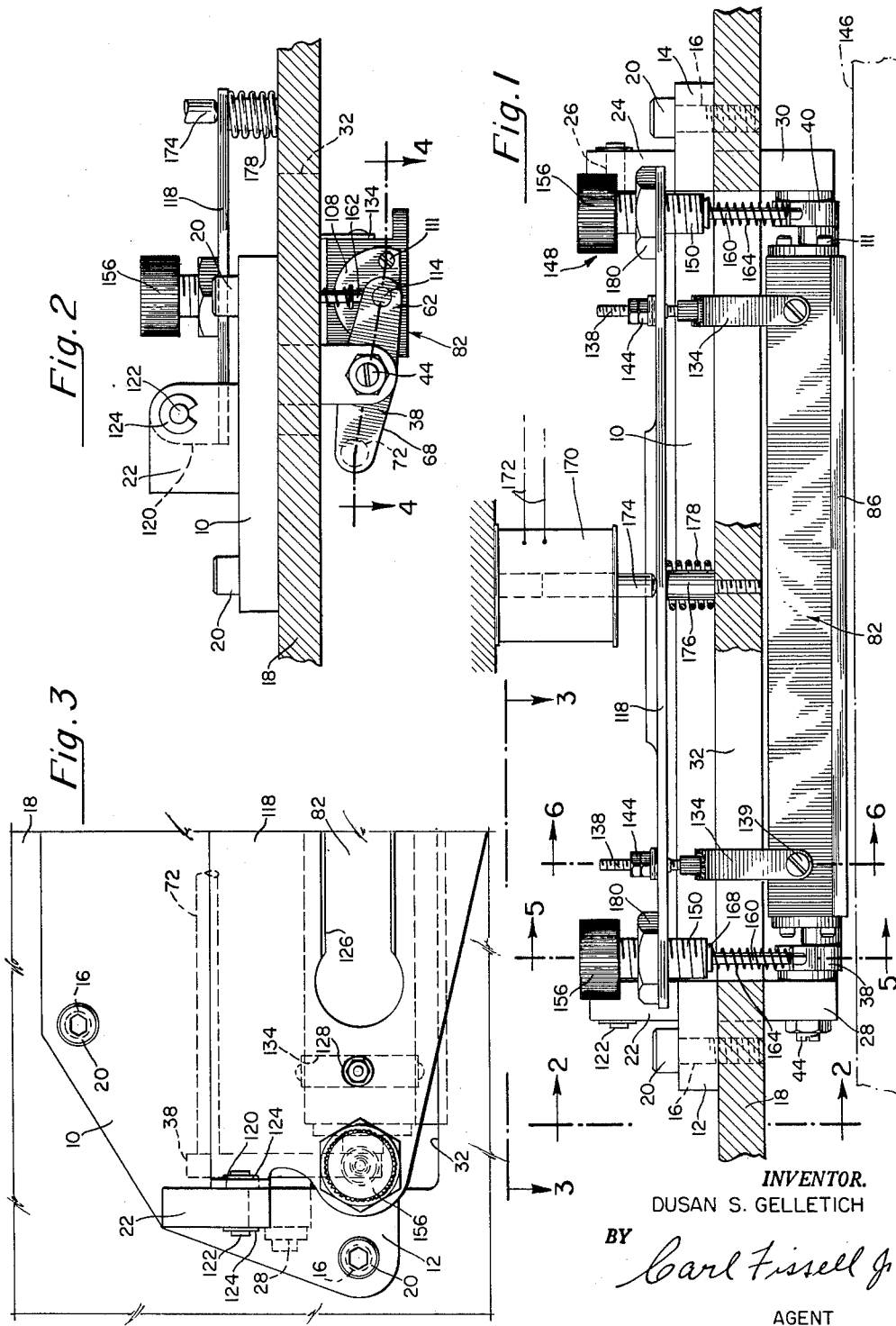
INVENTOR.
DUSAN S. GELLETICH
BY Carl Fissell Jr.
AGENT Nov. 10, 1964  D. S. GELLETICH  3,156,786
SUSPENSION SYSTEM FOR ELECTROMAGNETIC TRANSDUCERS
Filed Sept. 22, 1961  2 Sheets-Sheet 2
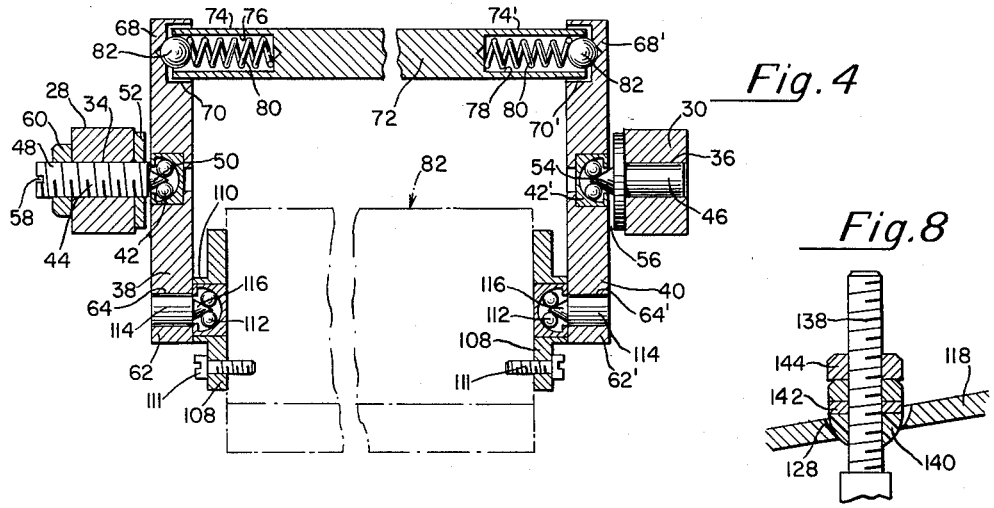
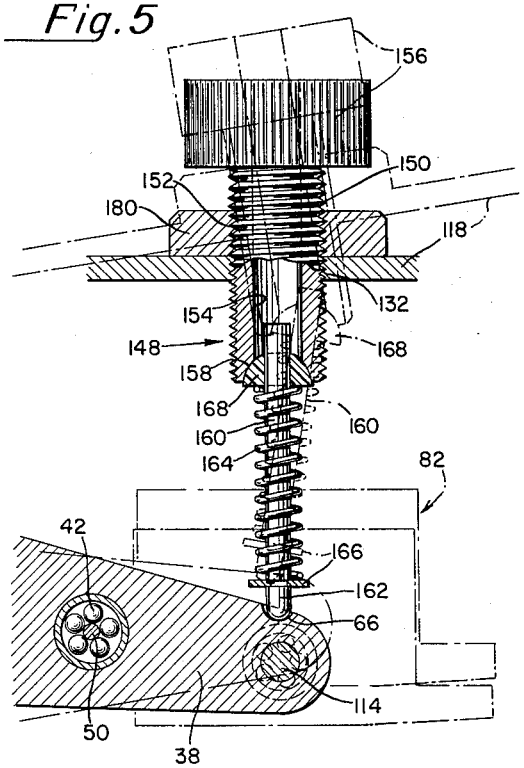
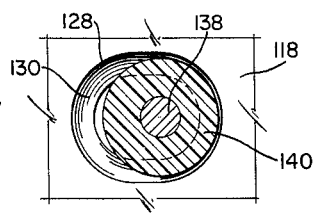
INVENTOR.
DUSAN S. GELLETICH
BY
Carl Fissell Jr.
AGENT

United States Patent Office 3,156,786
Patented Nov. 10, 1964

3,156,786
SUSPENSION SYSTEM FOR ELECTROMAGNETIC TRANSDUCERS
Dusan S. Gelletich, Philadelphia, Pa., assignor to Burroughs Corporation, Detroit, Mich., a corporation of Michigan
Filed Sept. 22, 1961, Ser. No. 140,080
3 Claims. (Cl. 179—100.2)

This invention relates to electromagnetic transducer assemblies and more particularly, to a suspension system for electromagnetic transducers wherein the transducer partakes of a substantially straight-line movement toward and away from an associated recording medium without touching the same. More particularly, the invention has to do with a suspension system for air guided electromagnetic transducers in which the problem of raising and lowering the head normal to the path of movement of the recording medium is solved in a novel manner permitting the head to float in air bearing relationship relative to the surface of a recording medium at a very close spacing therefrom.

It is an important object of the invention to provide apparatus for positioning an electromagnetic transducer assembly adjacent a recording surface without damaging either the transducer or the recording surface.

It is another object of the invention to provide a suspension system for electromagnetic transducer apparatus wherein the operating gap between the transducer and the recording surface is of the order of microinches.

A still further object of the invention is to provide automatic electro-mechanical means for positioning an electromagnetic transducer assembly in air bearing relationship relative to a recording surface with a minimum of clearance between the transducer and the recording surface.

Another object is to provide a suspension apparatus for electromagnetic transducers whereby the transducer is movable about at least two axes at right angles to one another thus to enable the transducer to follow any undulations in the record medium while still maintaining the desired spacing therebetween.

In accordance with the foregoing objects and first briefly described herein, the present invention comprises a suspension system for air guided electromagnetic transducers including means for suspending one or more transducers adjacent the surface of a moving record medium whereby the transducer may move about two axes at right angles to one another in response to any undulations in the record medium, while constantly maintaining a fixed distance relative to the surface of the medium. The apparatus also includes means for biasing the transducer toward the record medium and for maintaining the transducer in such biased condition adjacent the surface of the record medium. Further there is included loading and retracting means permitting the transducer assembly to be moved toward and away from the record medium along a line normal to the surface of the medium, together with means for automatically positioning the transducer relative to the disc surface.

Other objects of the invention will be pointed out in the following description and claims and illustrated in the accompanying drawings, which disclose, by way of example, the principle of the invention and the best mode that has been contemplated for applying that principle.

In the drawings:

FIG. 1 is a front elevational view of the present invention with certain portions thereof cut away to expose the internal arrangement of the apparatus;

FIG. 2 is a side elevational view along the line 2—2 of FIG. 1 illustrating one end portion of the apparatus shown in FIG. 1;

FIG. 3 is a top plan view of one end of the apparatus along the line 3—3 of FIG. 1;

FIG. 4 is a sectional view along the line 4—4 of FIG. 2;

FIG. 5 is a sectional view along the line 5—5 of FIG. 1;

FIG. 6 is a sectional view along the line 6—6 of FIG. 1;

FIG. 7 is a detail view along the line 7—7 of FIG. 6; and,

FIG. 8 is a detail view of a portion of the apparatus of FIG. 6 illustrated in the raised terminal position.

Referring to FIGS. 1 to 4 inclusive of the drawings, the present preferred form of a suspension system for air guided electromagnetic transducers is seen to include a mounting frame 10 which may be fabricated from suitable rigid material such as aluminum. The outwardly extending parallel end portions 12 and 14 of member 10 are each provided with a mounting hole 16. Similar mounting holes are provided in a central rear portion of the frame 10. The frame 10 may be secured flush with a rigid horizontal mounting base 18 in suitable fashion, as for example, by means of the bolts 20 threaded into the base 18 through holes 16, as seen more clearly in FIG. 1.

Oppositely disposed mounting pedestals 22 and 24 projecting vertically upwardly from the mounting frame 10 are each provided with an aperture 26 therein, for purposes to be explained presently herein. A pair of oppositely disposed projections 28 and 30 depend vertically downwardly from the lower surface of the frame 10 through an enlarged rectangular opening 32 in the base 18. Projection 28, as seen in FIG. 4, is provided with a threaded aperture 34, while projection 30 includes an aperture 36 having a smooth axial bore. Projections 28 and 30 carry respective suspension arms 38 and 40 each of which is rockably, pivotally mounted on its associated projection by means of similar individual bearings 42 and 42′ by means of bearing pivot cones 44 and 46.

Bearing cone 44 is provided with a threaded shank 48 which is adjustably threadedly received in aperture 34 of projection 28 so that the conical end 50 projects into bearing 42. A spacing washer 52 is disposed between the suspension arm 38 and the projection 28. Bearing pivot cone 46 is press-fitted into aperture 36 with its tapered conical end 54 projecting into the bearings 42′. As is seen in FIG. 4, a slight space 56 is provided between the suspension arms 38 and 40 and the mounting pedestals 28 and 30 with which it is associated, for reasons which will be more apparent later on. Shank 48 of pivot cone 44 is provided with a slot 58 at its exposed end permitting the cone to be adjustable relative to the bearings 42 with which it is associated. A locking nut 60 is threaded thereon to secure the adjustment.

The forward ends 62 and 62′, FIGS. 2, 4 and 5, of the suspension arms 38 and 40 are provided with individual apertures 64 and 64′ respectively. Adjacent each aperture and slightly, rearwardly offset therefrom is a spherical seat or notch 66 (FIG. 5) for purposes to be explained presently. The opposite or rearward ends 68 and 68′ of the arms 38 and 40 are provided with shallow recesses or chambers 70 and 70′ respectively. An elongated loading bar 72 has its opposite ends 74 and 74′ drilled to provide cylindrical chambers 76 and 78. A spring 80 and a bearing 82 is received in each chamber thereby enabling the ends of the bar to be slidable against the tension of the springs within the respective chambers.

An electromagnetic transducer assembly 82, FIGS. 1, 2, 4 and 6, for this preferred embodiment of the present invention, is seen to include a transducer head shell 84, FIG. 6, of open rectangular construction, formed from suitable rigid material such as aluminum, having a projecting ledge or step 86 disposed along one of the longer edges 88 thereof and a shallow recess 90 around the inner periphery thereof, for purposes which will become more clear as the description proceeds. An elongated trough or U-shaped transducer head 92 which may be of the conventional comb type not shown, of brass or similar nonmagnetic stock, provided with a plurality of spaced slots and projections, not shown is provided with one or more head core forming members 94 of ferrite or other similar magnetizable material. Each core member 94 is substantially C-shaped, although other and different shapes may of course, be employed. Pairs of core members 94—94 forming a transducer head are introduced into the comb slots with their lower confronting ends 96—96 abutting a shim 98 of non-magnetic material, such for example, as silver, thus to provide an operating gap for each head. The heads are spaced from each other by means of non-magnetic shields (not shown) thus to avoid any undue cross-talk therebetween. Energizing windings 100 for each head are brought out through a dielectric cover member 102 fitted into recess 90 for attachment to a source of electrical potential or control signals, etc.

The head comb 92 is press-fitted into the head shell 84 with the gaps disposed downwardly, FIG. 6, adjacent the ledge or step 86. The gaps are thus exposed to view. Thereafter the interstices of the structure are filled with a dielectric potting compound 104 thus to seal the same from the atmosphere and provide a solid, rigid unitary assembly. The bottom surface of the assembly 82 is angled rightwardly, FIGS. 5 and 6, slightly as indicated by the reference character 106 for purposes to be explained presently. Finally, the operating gap area is honed and polished to a substantially planar surface 107.

At opposite ends of the assembly 82 there is located an individual bearing mounting member 108 having a projecting flange 110 thereon and secured to the assembly 82 by bolts 111. Each bearing mounting 108 is provided with an aperture therethrough into which a bearing member 112 is press-fitted. As seen most clearly in FIG. 4, the assembly 82 is supported at its opposite ends by means of pivot cones 114 press-fitted into respective suspension arms 38 and 40 with the forward conical ends 116 of each pivot cone 114 projecting into a respective bearing. The transducer assembly 82 is thus pivotally rockable about the two pivot cones 114.

An irregularly shaped loading and retracting member 118 of relatively thin rigid material, such for example, as metal, having oppositely disposed upstanding mounting hangers or tabs 120 (FIGS. 1, 2 and 3) is pivoted by means of short pins 122 and C-rings 124 to the vertically disposed pedestals 22 and 24 respectively, FIG. 1, for arcuate movement toward and away from the base 18. A central weight reducing cut-out or opening 126 extends throughout a major portion of the central part of member 118. On opposite sides of the cut-out 126 and relatively closely adjacent thereto are located individual holes 128, FIGS. 6 and 8, each provided with spherical radius 130 of slight depth which as seen in FIG. 7, is elongated from left to right (front to back, as viewed in FIG. 1). Oppositely disposed mounting holes 132, FIG. 5, are located on the right and left sides respectively of the holes 128, near the adjacent outer edge of the retracting member 118.

The transducer assembly 82 is supported relative to the member 118 by means of oppositely disposed lifter or control hanger members 134, one for each end of the assembly 82. Each lifter member is substantially Y-shaped (inverted) in outline configuration with the branching arms 136-136', see FIG. 6, extending away from a central leg or shank 138, in side by side arrangement. The legs 136-136' are secured to the shell 84 as by bolts 139. The shank 138 is threaded throughout its length and is adapted to carry a spherical bearing 140. Bearing 140 is disposed on the leg 138 with its spherical surface 140' adjacent the spherical surface 130 of the elongated slot 128 in the member 118, as seen most clearly in FIGS. 6 and 8, for purposes to be explained presently. A washer 142 and one or more nuts 144 are employed to lock the bearings 140 in position on shank 138 and to adjust the vertical positioning of the control hangers relative to the member 118.

The transducer assembly 82 is adjustably positionable relative to the surface of a record member 146 (FIG. 1) with which it is operably associated in a manner now to be explained. In the preferred embodiment the record member 146 takes the form of a rotatable disc having a magnetizable surface thereon, and rotated in conventional fashion by means not shown. It is to be understood, however, that the present invention could be used with a drum, or tape type recording media. A broken link mechanism having adjusting screws 148 for aid in such adjustment of the transducer assembly relative to the recording medium each are seen in FIG. 5, to include an enlarged cylindrical shank 150 provided with threads 152 and engageable with the threads of the apertures or mounting holes 132. Each adjusting screw 148 is provided with a hollow axial bore 154 extending therethrough for purposes to be explained presently. One end of each screw has an enlarged knurled handling portion 156 enabling easy adjustment thereof. The opposite end of the screw is provided with a spherical indent or cut-out 158.

An elongated pin 160 having a spherical end portion 162 is provided with a coil spring 164. One end of the spring abuts a collar 166 fixed to the pin adjacent the end 162, while the opposite end of the pin 160 carries a spherical bearing 168 similar to bearing 140 slidable thereon and against which the other end of the spring 164 abuts. The upper end of pin 160 is received within the bore 154 of the adjusting screw as seen most clearly in FIG. 5, with the spherical surface of bearing 168 riding in the spherical indent 158, while the lower spherical end 162 of the pin is urged by the tension of the spring 164 onto the spherical notch 166, in the respective suspension arms 38 and 40.

The head assembly 82, as seen in FIG. 1, is positionable adjacent the record member 146 by means of a plunger-type solenoid 170 energizable from an external source (not shown) of control signals over the leads 172. The solenoid is disposed with its plunger 174 in operative contact with the forward end of the loading member 118. A limit or stop member 176 threaded into the base 18 is provided with a retracting coil spring 178 which surmounts the same and abuts the underside of the member 118.

In order to initially position (or "set up") the transducer assembly 82 into its operative air bearing relationship with a record medium, whether it be a drum, tape or disc, the disc is stationary. Current is applied over leads 172 to solenoid 170 causing the plunger 174 to push the loading and retracting plate 118 downwardly as seen in FIGS. 1 and 2, against the tension of the return spring 178 to limit against the stop 176 causing the transducer assembly 82 to contact the surface of the disc 146. The lock nuts 180 on the adjusting screws 150 are unscrewed or "backed off" slightly, freeing the adjusting screws. A slight or nominal spring pressure is first applied to the assembly 82 by means of the screws 150. The nuts 144 on lifter members 134 (FIG. 8) are likewise "backed off" sufficiently to a slight vertical movement or "play" for example, approximately one-sixty-fourth of an inch between the washer and the nuts 144 relative to the apertures 128 of plate 118. Thereafter the upper-most nuts 144 are tightened, thus to secure this clearance adjustment. The solenoid 170 is now released permitting spring 178 to retract the head. The disc 146 is now rotated up to operating speed.

With the disc 146 rotating toward the shoe member 86 the air film generated on the disc surface due to its rotation is caused to wedge beneath the shoe, lifting the shoe and the head which is an integral part thereof, into a "flying or floating" condition relative to the surface of the disc. The head assembly 82 thus will float in air bearing relationship essentially parallel to the disc surface, by virtue of the slight angle 106 machined into the leading edge thereof. The loading and retracting plate 118 is thereafter eased downwardly by hand for example, against the pressure of the developed air bearing.

The adjustment providing the actual operating gap spacing is now made by suitable rotation of the two adjusting screws 148, against the tension of the springs 164 and the pressure of the air bearing so as to bring the transducer assembly 82 into the proper minimum desired clearance, for example, 200 microinches, relatives to the surface of the disc 146. Thereafter nuts 180 are tightened to lock and secure the adjustment. Waviness, runout or any undulations encountered as a result of the unevenness of the disc surface will cause the head and the lifter arms and their spherical bearings to be slightly displaced vertically within the holes 128 against the tension of the loading springs 164, at opposite ends of the suspension arms. It is to be noted in this connection that the actual spacing between the assembly 82 and the surface of the disc 146 shown in the drawing in FIG. 1, is schematic and exemplary only, since the drawings are not made to the actual scale of the apparatus. The actual spacing is on the order of microinches as beforementioned. The head assembly 82 may now be positioned adjacent the disc surface solely by means of the solenoid 170.

When for example, a recording and/or reading operation is completed and it is desired to retract the transducer assembly 82 away from its position adjacent the surface of the disc, the current to the solenoid 170 is cut off causing the plunger 174 to retract permitting the spring 178 around the stop pin 176 to force the loading and retracting plate 118 arcuately upwardly in FIGS. 1 and 2, lifting the transducer assembly 82 substantially vertically upwardly away from the disc 146.

As was earlier pointed out herein, the present invention solves the problem of providing the exact, desired angle of attack or flying angle with respect to the disc surface thus preventing inadvertent or accidental contact between the transducer assembly 82 and disc surface when the assembly is moved suddenly, quickly, by means of the solenoid into operative relation with respect to the disc. The transducer is by this means, automatically floated adjacent the surface at an exact accurate, predictable and desired spacing. This is seen most clearly in FIGS. 5 through 8, wherein the various operating elements of the preferred embodiment of the invention are set forth in detail and wherein the angular relationships of the various elements, one with another, and with respect to the disc surface, are set forth, in more or less detail.

In this connection it will be noted that the present suspension arrangement permits the transducer assembly 82 to move along substantially a straight line, vertically upwardly and downwardly toward and away from the record medium, as a result of the spherically shaped elongated slots 128, provided in the loading and retracting plate 118 which permit the spherical bearings 140 to slide forwardly and backwardly relative to the elongation in the slots with which each bearing is associated as the lifter arms 134 are being moved by the plate 118 vertically, upwardly and downwardly. Thus, when the solenoid 170 is energized to permit its plunger 174 to push the plate 118 downwardly, for example, the lifter arms and associated bearings are moved from the dotted line position of FIG. 6 to the full line position. Since the adjusting screws 150 are fixed when once adjusted relative to member 118, it is seen that when transducer assembly 82 is raised or lowered, the spherical bearings 168 permit the spring pins 160 with which each is associated to move angularly rightwardly from the full line to the dotted line position, as the loading plate is raised.

As can be seen from a reference to FIG. 4, for example, the present novel arrangement which partakes of a gimbal suspension permits the transducer assembly to pitch slightly from back to front as well as about the longer mounting axis of the assembly. The transducer assembly thus has the capacity to move about two axes which are substantially perpendicular to one another thus accommodating itself to any undulatory effects of the disc caused by runout, etc.

What is claimed is:

1. Electromagnetic transducer mounting apparatus comprising,
   (a) a supporting frame,
   (b) a loading and retracting member pivotally mounted for movement toward and away from said frame,
   (c) an electromagnetic transducer including one or more read-record heads thereon and provided with a forwardly projecting air bearing ledge extending the length thereof,
   (d) lifting means disposed intermediate the ends of said transducer and including means for frictionally engaging said loading and retracting member permitting said transducer to be moved conjointly therewith,
   (e) oppositely disposed rocker arms pivotally mounted intermediate their ends on said supporting frame for rocking movement relative thereto,
   (f) means rockably mounting said transducer between one pair of opposite ends of said rocker arms,
   (g) means resiliently interposed between and interengaging the other pair of opposite ends of said rocker arms permitting said rocker arms to move slightly relative to one another, and
   (h) a broken link mechanism adjustably, operably engaging said one pair of opposite ends of said rocker arms and said loading and retracting member having means biasing said mechanism toward said transducer and including means permitting interengaging, oppositely disposed end portions of said mechanism to move angularly with respect to said transducer and said loading and retracting member effective thereby to adjustably position said transducer relative to said mounting means and a record member with which it may be operably associated and in combination with the relative movement of said rocker arms thereby permitting said transducer to retract vertically away from said recorder member while maintaining a preadjusted condition relative to said record member.

2. Electromagnetic transducer mounting apparatus comprising,
   (a) a supporting frame having an aperture therein,
   (b) a loading and retracting member pivotally mounted for movement toward and away from said aperture,
   (c) an electromagnetic transducer including one or more read-record heads thereon and provided with a forwardly projecting air bearing ledge extending the length thereof,
   (d) oppositely disposed lifting means intermediate the ends of said transducer and including means for frictionally engaging said loading and retracting member permitting said transducer to be moved conjointly therewith,
   (e) a pair of rocker arms pivotally mounted intermediate their ends on opposite sides of said supporting frame adjacent said aperture for rocking movement relative to said aperture,
   (f) means rockably mounting said transducer between one pair of opposite ends of said rocker arms,
   (g) an elongated rigid member resiliently disposed between and interengaging the other pair of opposite ends of said rocker arms permitting said rocker arms to move slightly relative to one another, and
   (h) a broken link mechanism adjustably, operably engaging said one pair of opposite ends of said rocker arms and said loading and retracting member and including oppositely disposed members telescopically, slidably, movable relative to each other and a biasing member engageable with said one of said oppositely disposed members permitting said opposite members to move angularly relative to one another as well as with respect to said transducer and said loading and retracting member, effective thereby to adjustably position said transducer relative to said mounting means and a record member with which it may be operably associated and in combination with the relative movement of said rocker arms thereby permitting said transducer to rock and roll about two substantially perpendicular axes while maintaining a preadjusted condition relative to said record member.

3. Electromagnetic transducer mounting apparatus comprising,
 (a) a supporting frame having a rectangular aperture therein,
 (b) a loading and retracting member pivotally mounted for movement toward and away from said aperture, said retracting member having a pair of elongated substantially spherical openings therein,
 (c) an electromagnetic transducer including a plurality of read-record heads thereon and provided with a forwardly projecting air bearing ledge extending the length thereof,
 (d) a pair of U-shaped lifter members adjustably disposed intermediate the ends of said transducer and including means for frictionally slidably engaging the spherical openings in said loading and retracting member permitting said transducer to be moved conjointly therewith,
 (e) oppositely disposed rocker arms adjustably, pivotally mounted intermediate their ends adjacent said supporting frame for rocking movement relative to said aperture,
 (f) bearing means rockably mounting said transducer between one pair of opposite ends of said rocker arms,
 (g) a broken link mechanism, said mechanism including a hollow threaded member engaging said loading and retracting member, and a member telescopically, slidably, receivable within said hollow member,
 (h) spring means biasing said slidable member away from said hollow member, and
 (i) bearing means intermediate said spring means and said hollow member permitting said slidable member to move angularly relative to said hollow member causing said spring means to bias said slidable member into operative engagement with said one pair of opposite ends of said rocker arms effective thereby to adjustably position said transducer relative to said mounting means and to a record with which it may be associated thereby to maintain the prescribed adjustment when said transducer is disposed in a retracted position relative to said record member as well as when said transducer is disposed in operative airbearing relation relative to said record member.

References Cited in the file of this patent

UNITED STATES PATENTS

| | | |
|---|---|---|
| 2,950,354 | Hohnecker | Aug. 23, 1960 |
| 3,060,277 | Baker | Oct. 23, 1962 |